Feb. 26, 1957 — A. S. NORCROSS — 2,782,629
TEMPERATURE COMPENSATED VISCOMETER
Filed March 11, 1954 — 3 Sheets-Sheet 1
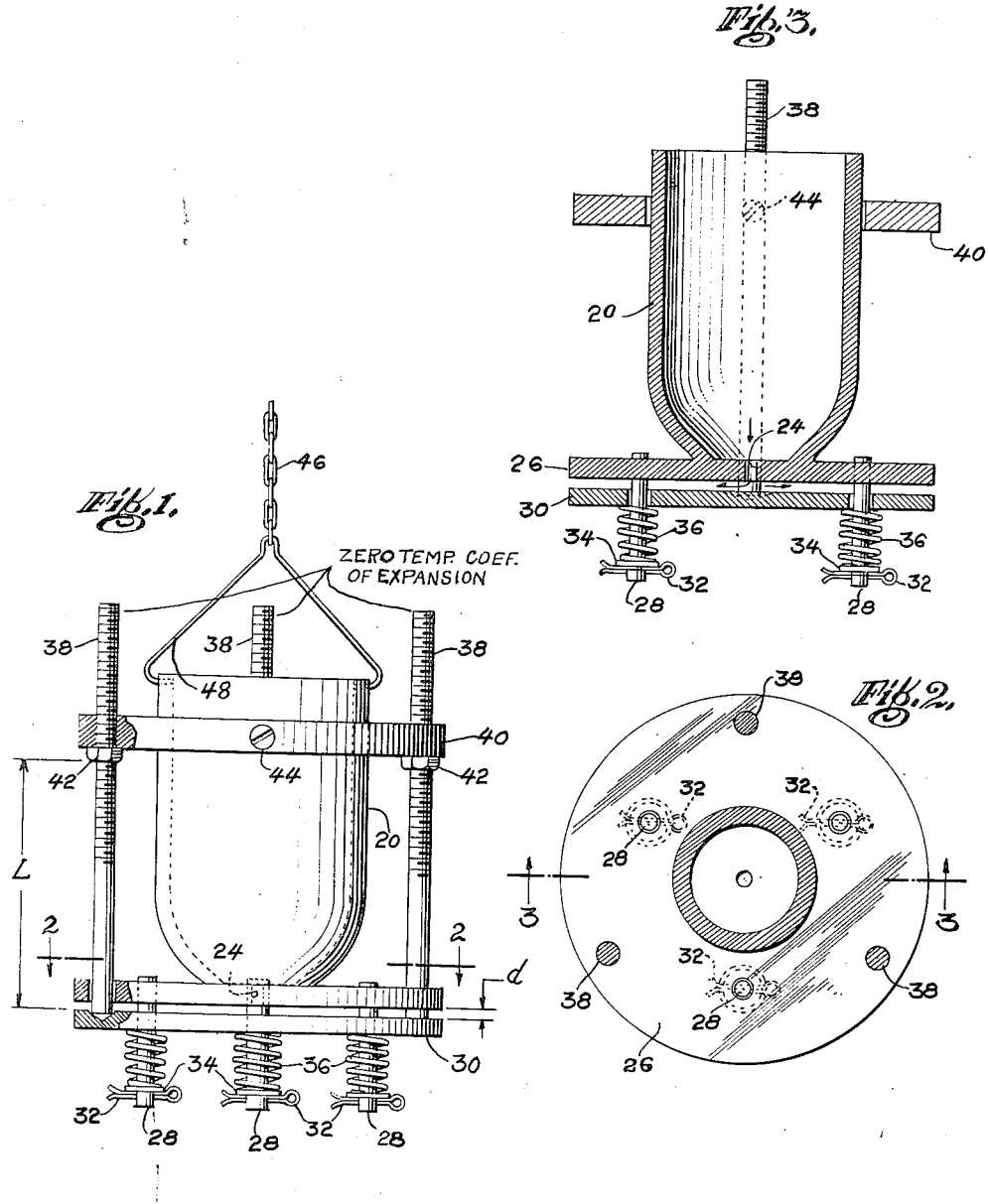
INVENTOR.
Austin S. Norcross Feb. 26, 1957  A. S. NORCROSS  2,782,629
TEMPERATURE COMPENSATED VISCOMETER
Filed March 11, 1954  3 Sheets-Sheet 2
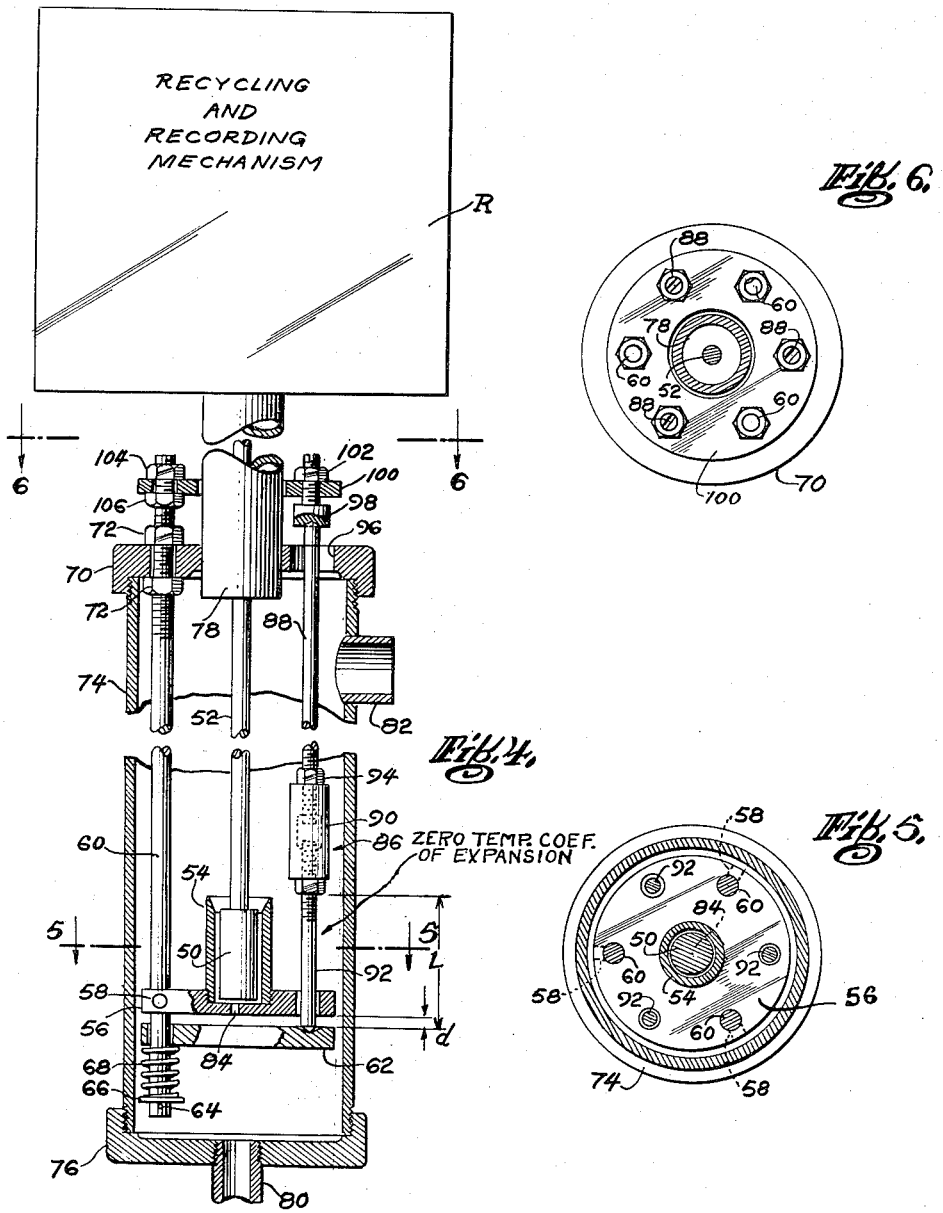
INVENTOR.
Austin S. Norcross
BY
Davis, Hoxie & Faithfull

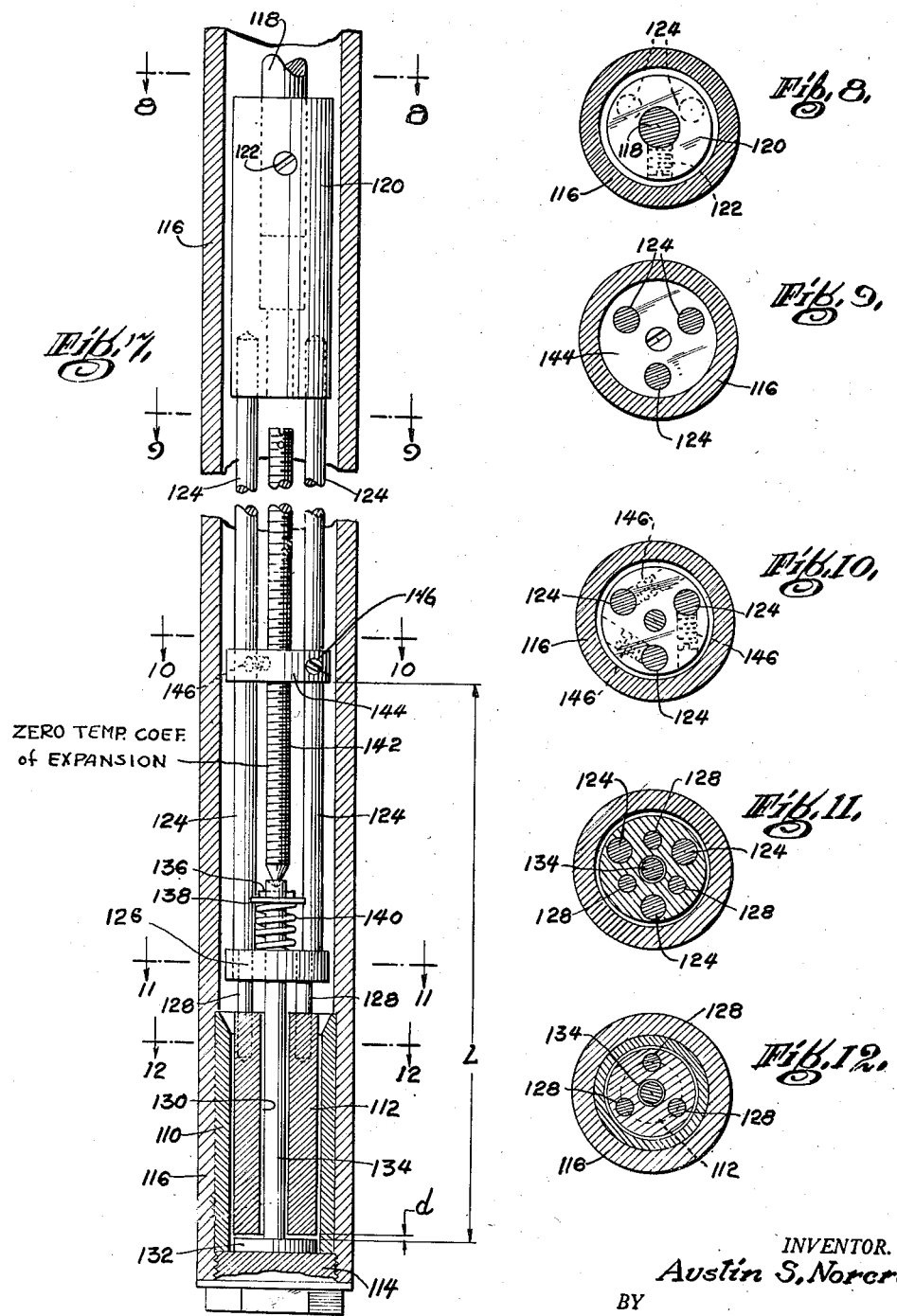

United States Patent Office 2,782,629
Patented Feb. 26, 1957

2,782,629
TEMPERATURE COMPENSATED VISCOMETER

Austin S. Norcross, Newton, Mass.

Application March 11, 1954, Serial No. 415,482

12 Claims. (Cl. 73—57)

Because temperature has such a great influence upon the viscosity of a great many fluids, it is one of the principal factors which must be taken into account when determinations of viscosity are to be made. It is of course possible to make all tests at the same fluid temperature or to apply a correction factor obtained from a table or chart to the reading obtained from a viscometer, but such test procedures are more applicable to a laboratory than to an industrial process where it often is not possible to maintain the temperature constant, continuous control is many times essential, and the operating personnel may have neither the skill nor time to follow laboratory procedures.

It is accordingly the object of the present invention to provide apparatus for determining viscosity which will indicate or record the viscosity of a fluid in terms corresponding to a standard viscosity irrespective of the temperature of the fluid at which the viscosity determination is made, which does not require any separate determination of the fluid temperature, which is automatic in operation, which does not require any special skill on the part of the operator, which can be used with existing viscometers, and which advances the art generally.

According to the present invention, apparatus for determining the viscosity of a fluid comprises means including an orifice for determining the rate of flow of the fluid, for example, by the pressure drop across the orifice or by the elapsed time required for a given volume of fluid in a reservoir to flow through the orifice. The reservoir may be a simple cup or, as in one of the more refined types of viscometers, the cavity formed by a cylinder and the piston associated therewith. In any of the above or similar types of rate of flow viscometers the effective area of the orifice is varied as a function of temperature, for example, by locating a member, such as a plate, adjacent an aperture through which the fluid flows, the supports for the plate member and the aperture defining member being of materials which have different temperature co-efficients of expansion so that the spacing between the aperture and the plate member, and therefore the effective area of the orifice, varies as a function of temperature. In viscometers of the type having a dropping piston, such as is shown in United States Letters Patent No. 2,491,389 to Norcross, the aperture is located either in bottom of the cylinder or in the piston so as to form a secondary orifice which provides a parallel flow path to the primary orifice formed by the clearance between the piston and the cylinder wall.

These and other objects and aspects will be apparent from the description of several specific embodiments of the invention which refer to drawings wherein:

Fig. 1 is a side elevation view of one embodiment of the invention;

Fig. 2 is a sectional view on line 2—2 of Fig. 1;

Fig. 3 is a sectional view on line 3—3 of Fig. 2;

Fig. 4 is a sectional elevation view of a second embodiment of the invention;

Fig. 5 is a sectional view on line 5—5 of Fig. 4;

Fig. 6 is a sectional view on line 6—6 of Fig. 4;

Fig. 7 is a sectional elevation view of a third embodiment of the invention; and Figs. 8 to 12 are cross-sectional views taken as indicated on Fig. 7.

The first embodiment of the invention comprises a simple cylindrical cup 20 made, for example, of brass, the upper end of the cup 20 being open and bottom end closed by an integrally formed hemispherical head 22 except for a small circular aperture 24 at the center thereof. The aperture 24 also passes through the center of a cylindrical flange 26 which is cast integrally with the head 22 with the axis thereof coinciding with the axis of the cup 20. Projecting downwardly from the flange 26 are three equally spaced studs 28 which pass through clearance holes in a plate member 30. At the bottom end of each stud 28 is a transverse hole wherein is inserted a cotter pin 32 which secures a washer 34 seating one end of a spring 36. The other ends of the springs 36 bear against the lower face of the plate member 30 to urge the member upwardly towards the flange 26.

The plate member 30 is maintained at a short distance $d$ from the flange 26 by three elongated struts 38 whose pointed lower ends project through clearance holes in the flange to engage respective recesses in the top face of the plate member. The upper ends of the elongated struts 38 are threaded to engage corresponding threaded apertures in an annular yoke 40 which encloses the cup 20. The struts 38 are held in adjusted position by means of check nuts 42 so that the effective length of the struts between the bottom of the yoke 40 and the top of the plate member remains fixed. The yoke 40 is secured to the cup by set screws 44 so that its axial position is also adjustable.

A chain 46 is connected to the top of the cup 20 by a bail 48 so that the cup can be lowered into the fluid to be tested and an amount of fluid withdrawn which corresponds in volume to the reservoir formed by the cup and hemispherical head 22. The elapsed time required for the liquid in the reservoir to drain out through the aperture 24 and then between the flange 26 and the plate member 30 is a measure of the viscosity of the fluid at the temperature at which the viscosity measurement is made. With an elevation of temperature the viscosity of most fluids decreases and the time to drain the cup 22 decreases if the area of the orifice remains constant. The effect of such temperature factor can be substantially eliminated by reducing the effective size of the discharge orifice as a function of temperature so that the time required to drain the cup 22 remains constant, i. e., a constant viscosity reading in terms of a selected standard temperature is obtained irrespective of the temperature of the fluid being tested.

It will be apparent that the effective orifice is determined by the circumference of the bottom lip of the wall of the aperture 24 and the spacing of the plate member 30 therefrom. As the diameter of the aperture 24 and therefore the circumference of its defining wall remain fixed, moving the plate towards the flange 26 will reduce the effective area of the orifice; and conversely, moving the plate member from the flange increases the effective orifice area. To this end the struts 38 are made of a material having a different co-efficient of expansion than the brass cup 20 and its associated parts. Although it is to be understood that my invention is in no way limited thereto, I prefer to make the struts 38 of a stainless steel having a substantially zero co-efficient of expansion over ordinary temperature ranges, such as is sold under the trade names of "Nilvar" and "Invar." As the temperature of the fluid increases, the effective length $L$ of the studs 38 remains constant, but the brass cup 20 expands decreasing the distance $d$ between the flange 26 and the plate member 30, thereby to decrease the effective area of the orifice. Conversely, the distance $d$ is increased to increase the effective area of the orifice as the fluid temperature is decreased and the brass cup 20 contracts. By proper proportioning of the strut length L and the spacing distance $d$ between the flange 26 and the plate member 30, the change in effective area of the orifice can be made to compensate for variation in actual viscosity so that the elapsed time to drain the cup 20 remains constant. The effective length L is varied by loosening the set screws 44 and moving the yoke 40 relatively to the cup 20, the struts 38 being screwed (or unscrewed) into the threaded apertures of the yoke, if necessary. The distance $d$ is adjusted, after the set screws 44 are tightened to fasten the yoke 40 with respect to the cup 20, by the turning of the struts 38.

In the second embodiment of the invention illustrated in Figs. 4 to 6, R represents a re-cycling and recording mechanism which may be similar to either of those described in detail in United States Letters Patent No. 2,491,389 and No. 2,630,819 to Austin S. Norcross so that these need not be discussed further than to say that a cam or other means incorporated therein periodically lifts and then releases by means of a rod 52 a droppable body such as the piston 50. The piston 50 and its associated cylinder 54 are immersed in the fluid whose viscosity is being tested so that as the piston is raised the resulting reservoir formed by the cylinder is filled with the fluid. When the piston is then released, the time required for it to displace the entrapped fluid due to the restoring force exerted by gravity is timed as a measure of the viscosity. In the viscometers described in the above mentioned patents, the clearance between the piston and cylinder was made great enough to act as an annular orifice through which the entrapped liquid escapes.

The viscometer illustrated in Figs. 4 to 6 also is provided with clearance between the piston 50 and the cylinder 54 which acts as a primary orifice and has a further secondary temperature compensated orifice which will be described in detail below. To this end the lower end of the cylinder 54 is closed by threading it into a threaded recess in a circular flange 56 which is secured by set screws 58 to the lower ends of three equally spaced elongated struts such as the support rods 60 that are made of brass or a similar material. The lower ends of the support rods 60, which pass through clearance holes in a plate member 62, are each provided with a transverse aperture for a pin 64. Resting upon each of the pins 64 is a respective washer 66 which acts as a seat for the lower end of a helical spring 68. The upper ends of the springs 68 bear against the lower surface of the plate member 62 thereby yieldably to urge the member upwardly towards the flange 56.

The upper end of each of the support rods 60, which passes through a corresponding clearance hole in a housing cap 70, is threaded to engage a pair of nuts 72, one of which is located on either side of the cap so that the rods and attached elements are suspended therefrom. The cap 70 is threadedly connected to one end of a cylindrical housing 74 whose opposite end is closed by a similar cap 76. The housing 74 is supported upon the end of a tube 78 which extends between the re-cycling mechanism R and the cap 70 and which also acts as an enclosure for the piston rod 52. The fluid to be tested enters the housing 74 through a nipple 80 in the cap 76 and leaves through a nipple 82 welded in the housing side wall.

Located in the center of the cylinder flange 56 is a circular aperture 84 which with its associated plate member 62 form the secondary orifice through which a portion of the entrapped fluid escapes as the released piston 50 descends within its cylinder 54. It will be evident that by varying the relative position of the plate member 62 with respect to the flange 56 as a function of the fluid temperature, the effective area of the secondary orifice will also vary as a function of temperature in a manner similar to that described in detail above with reference to the first embodiment of the invention. Accordingly, the movement of the plate member 62 towards the flange 56 by the springs 68 is restrained by three struts 86 each consisting of a brass rod 88 and a rod 92 of a material such as stainless steel, having a substantially zero temperature co-efficient of expansion, the adjoining ends of the rods being connected by a threaded coupling 90 and locked by check nuts 94.

The lower pointed end of each of the steel rods 92 projects through an aperture in the plate member 62 to engage a corresponding recess in the plate member 62. The upper pointed end of each of the brass rods 88 passes through an aperture 96 in the housing cap 70 to engage a recess in the head of a respective cap screw 98 which threads into a top plate 100. The ends of the shanks of the cap screws 98 are slotted so that the screws can be turned in or out of the top plate 100 which provides an adjustment of the spacing between the flange 56 and the plate member 62 designated $d$.

The top plate 100 is held in position by the brass rods 60, the upper threaded ends of which pass through clearance holes in the plate to engage nuts 104 and 106 located on either side of the plate. The apertures 96 in the cap 70 for the rods 88 are of large enough diameter to pass the couplings 90 so that when the nuts 104 are removed the plate 100 can be lifted and the struts 86 withdrawn from the housing 64. With the struts 86 withdrawn the steel rods 92 can be turned in or out of the couplings 90 thereby to adjust their effective lengths L. Corresponding but opposite adjustments are simultaneously made in the effective lengths of the brass rods 88 by moving them out or into the top of the coupling 90, as the case may be, so that the overall lengths of the struts 86 remain constant irrespective of the adjustment of the effective lengths L of the rods 92.

As mentioned heretofore, the viscosity of the fluid within the housing 74 is measured by lifting the piston 50 so that the resulting reservoir formed by the cylinder 54 is filled. The piston 50 is then released so that it falls forcing the fluid out of the reservoir, the elapsed period of time required for the piston to bottom upon the flange 56 being a measure of the fluid viscosity. As the piston 50 drops, the fluid flows out through the primary orifice formed by the clearance between the piston 50 and the cylinder 54 and the secondary orifice formed by the aperture 84 and the plate member 62. As the fluid temperature increases the length of the brass support rods 60 is also increased to lower the flange 56 whereas the effective length L of the stainless steel rods 92 remains substantially constant and the plate member 62 remains relatively fixed so that the spacing $d$ between the flange and the plate member is reduced. This reduction in the spacing $d$ reduces the effective area of the secondary orifice. By proper proportioning of L and $d$ is is possible to vary the area of the secondary orifice to compensate for the variation of viscosity with a change in temperature so that the period of fall of the piston 50 is independent of the fluid temperature, i. e., the viscosity determined is in terms of a standard temperature.

The actual values of L and $d$ will vary with the dimensions of the piston 50, the cylinder 54, and the aperture 84, but it has been found that satisfactory temperature compensation is obtained in measuring the viscosity of a fluid such as #30 SSU oil with a viscometer constructed as described and having the various elements proportioned approximately as follows:

| | Inches |
|---|---|
| Flange aperture | 0.125 |
| Piston diameter | 0.745 |
| Cylinder diameter | 0.750 |
| $d$ | 0.008 |
| L | 7.000 |

In the third embodiment of the invention shown in Figs. 7 to 12, the primary orifice for the escape of fluid entrapped in the cylinder 110 by the descent of the piston 112 is again formed by the clearance between the wall of the cylinder 110 and the piston 112 in a manner similar to that described in detail above. In this embodiment the secondary orifice for permitting the escape of entrapped fluid is not in the flange closing the bottom of the cylinder as in the above described embodiment, but is formed by an aperture disposed along the axis of the piston 112 itself, as will be described in detail hereinafter.

The cylinder 112 is carried in the lower end of a tube 116 having apertures (not shown) in its side wall for the admission of fluid whose viscosity is to be determined. The tube 116 extends downwardly from a cam operated re-cycling unit (not shown) similar to that described in the afore-mentioned Norcross patents, the tube 116 also serving as an enclosure for a piston rod 118 extending downwardly from the cam unit. The depending end of the piston rod 118 is inserted in an aperture in a cylindrical block 120 which is attached thereto by a set screw 122. Secured in three equally spaced recesses in the lower face of the cylindrical block 120 are three elongated brass struts or rods 124 which extend downwardly lengthwise within the tube 116. At the lower end of the rods 124 is attached a cylindrical bridge 126, preferably turned from brass. Extending downwardly from the bridge 126 to connect with the top of the piston 112 are three equally spaced brass pins 128 so that as the piston rod 118 is raised the piston 112 is conjointly raised by an interconnecting linkage including the cylindrical block 120, the rods 124, the bridge 126 and the struts 128.

As mentioned above, the secondary orifice is formed by an aperture 130 and a cooperating cylindrical plate member 132. The plate member 132 is attached to the lower end of a stainless steel rod 134 which extends through the piston aperture 130. The upper end of the rod 134 has secured thereto by means of a transverse pin 136, a washer 138 which acts as a seat for the top end of a helical spring 140. The other end of the spring 140 bears against the top of the bridge 126 so as to urge the plate member 132 upwardly towards the lower face of the piston 112. The spacing $d$ between the piston 112 and the plate member 132 is maintained against the spring force by means of an elongated pointed screw 142 also of stainless steel which engages a threaded aperture in an upper bridge 144 attached to the rods 124 by set screws 146 so that the pointed end of the screw projects into a recess in the top of the rod 134. The distance L is adjusted in the embodiment shown in Figs. 7 to 12 by loosening the set screws 146 and rotating the screw 142 by inserting a screw driver in the slot in the upper end thereof. The set screws 146 are then tightened to secure the bridge 144 and the screw 142 again rotated to adjust the spacing $d$. To facilitate this small latter adjustment a transverse hole is provided in the screw 142 immediately below the screw driver slot so that a pin can be inserted therein. If a distance L is required that is less than can be obtained with the bridge 144 at its lowermost position, the entire rod 134 or a portion thereof may be made of brass.

With a constant fluid temperature it will be evident that there will be no relative movement between the piston 112 and the plate member 132 as they are conjointly lifted and dropped by the piston rod 118. When the piston 112 is dropped, some of the fluid entrapped in the cylinder 110 flows between the piston and cylinder. The remainder of the fluid passes between the plate member 132 and the bottom of the piston and then up through the aperture 130 between the rod 134 and the piston. By making the rod 134 of a material such as a stainless steel having a substantially zero co-efficient of expansion and the remaining parts of the piston assembly of brass or other material having a considerable expansion with temperature increases, a rise in the temperature of the fluid will reduce the spacing $d$ between the plate member 132 and the piston 112 so that the effective area of the secondary orifice also is reduced. The effects of temperature can therefore be compensated for and a viscosity determination at a standard temperature can be obtained by proper proportioning of the various elements in a manner similar to that described in detail with respect to the second embodiment.

It should be understood that the present disclosure is for the purpose of illustration only and that this invention includes all modifications and equivalents which fall within the scope of the appended claims.

I claim:

1. Apparatus for determining the viscosity of a fluid comprising a cylinder member having a bore disposed therein, a piston member reciprocally disposed in the bore, the cylinder and piston members being immersed in the fluid so that the fluid is entrapped as the piston member is withdrawn from the bore in the cylinder member, the radial clearance between the cylinder and piston members being sufficiently great to form a primary annular orifice through which a portion of the entrapped fluid escapes to permit the piston member to be returned whereby the time required for the piston member to return a predetermined distance under the influence of a restoring force is a measure of the fluid viscosity, one of the members having an aperture extending therethrough to form a fluid passage in parallel with the primary orifice so that the remainder of the entrapped fluid passes therethrough, flow restricting means disposed adjacent the end of the aperture to form a secondary orifice which limits the flow of fluid through the aperture, and temperature responsive means for varying the spacing of the flow restricting means with respect to the end of the aperture as a function of the temperature of the fluid whereby the time for the piston to return is a measure of the viscosity of the fluid in terms corresponding to a standard temperature irrespective of the actual temperature of the fluid.

2. Apparatus for determining the viscosity of a fluid according to claim 1 wherein the aperture is in the bottom of the cylinder member and separate supports are provided respectively for the cylinder member and a flow restricting means which supports have different temperature co-efficients of expansion whereby to vary the effective area of the secondary orifice as a function of fluid temperature.

3. Apparatus for determining the viscosity of a fluid according to claim 2 wherein the flow restricting means is in the form of a plate.

4. Apparatus for determining the viscosity of a fluid according to claim 3 wherein the bottom of the cylinder member is supported by one or more elongated struts of a material having one temperature co-efficient of expansion and the plate is supported by one or more elongated struts of a material having a different temperature coefficient of expansion.

5. Apparatus for determining the viscosity of a fluid according to claim 4 wherein the struts supporting the bottom of the cylinder member and the plate are alternatively disposed and equally spaced at the same distance from the axis of the cylinder.

6. Apparatus for determining the viscosity of a fluid according to claim 5 wherein one or more springs are provided to maintain the plate in engagement with the ends of its supporting struts.

7. Apparatus for determining the viscosity of a fluid according to claim 14 wherein the springs are carried upon the ends of the struts which support the bottom of the cylinder member.

8. Apparatus for determining the viscosity of a fluid according to claim 1 wherein the aperture is in the piston member and the flow restricting means is a plate disposed adjacent the aperture and movable conjointly with the piston member, the piston member and the plate having respective supports which have different temperature co-efficients of expansion so that the plate moves relatively to the piston member with changes of temperature thereby to vary the effective area of the secondary orifice.

9. Apparatus for determining the viscosity of a fluid according to claim 8 wherein the support for the plate is an elongated rod which extends through the piston member aperture.

10. Apparatus for determining the viscosity of a fluid according to claim 9 wherein the piston member is carried by a plurality of equally spaced elongated rods.

11. Apparatus for determining the viscosity of a fluid according to claim 10 wherein two spaced bridges are also carried by the piston member supporting rods and a spring is interposed between the lower bridge and the supporting rod for the plate, the upper bridge carrying a member which bears against the supporting rod for the plate in opposition to the force exerted by the spring thereby to determine the spacing between the end of the piston member and the plate.

12. Viscosity apparatus comprising a tubular member adapted to be substantially vertically disposed within a body of liquid the viscosity of which is to be determined, a droppable member disposed within said tubular member; means for periodically elevating and releasing said droppable member so that the period required for the droppable member to traverse the fluid entrapped within the tubular member is a function of the viscosity thereof, means for timing the duration of said droppable body in traversing a predetermined portion of said entrapped fluid as an index of viscosity, one of the members having an aperture extending therethrough to form a fluid passage through which a portion of the entrapped fluid escapes, flow restricting means disposed in spaced relationship with respect to the end of the aperture to form an orifice, and means incorporating materials having different temperature co-efficients of expansion mechanically interconnecting the flow restricting means and the member having the aperture extending therethrough to vary the effective area of the orifice as a function of temperature maintaining the rate of flow of the fluid substantially constant over a range of fluid temperatures so that viscosity measurement is in terms corresponding to a standard temperature irrespective of the actual temperature of the fluid.

References Cited in the file of this patent

UNITED STATES PATENTS

| | | |
|---|---|---|
| 1,962,861 | Ericson | June 12, 1934 |
| 2,012,550 | Powis | Aug. 27, 1935 |
| | (Corresponding to British Patent 442,974) | |
| 2,033,302 | Rockwell | Mar. 10, 1936 |

FOREIGN PATENTS

| | | |
|---|---|---|
| 442,974 | Great Britain | Feb. 19, 1936 |